(12) United States Patent
Lake et al.

(10) Patent No.: US 8,123,955 B2
(45) Date of Patent: Feb. 28, 2012

(54) METHOD OF OPTIMIZING FEED CONCENTRATION IN A SEDIMENTATION VESSEL

(75) Inventors: Philip Lake, Murray, UT (US); Mark Crozier, Honeydew (ZA); Jeffery H. Easton, Cottonwood Heights, UT (US)

(73) Assignees: WesTech Engineering Inc., Salt Lake City, UT (US); Paste Thick Ventures LLC, Salt Lake City, UT (US)

( * ) Notice: Subject to any disclaimer, the term of this patent is extended or adjusted under 35 U.S.C. 154(b) by 186 days.

(21) Appl. No.: 12/613,131

(22) Filed: Nov. 5, 2009

(65) Prior Publication Data
US 2011/0100931 A1  May 5, 2011

(51) Int. Cl.
*B01D 21/24* (2006.01)
(52) U.S. Cl. ........ 210/712; 210/800; 210/805; 210/194; 210/207; 210/519
(58) Field of Classification Search ............... 210/712, 210/800, 801, 805, 194, 197, 207, 519, 532.1
See application file for complete search history.

(56) References Cited

U.S. PATENT DOCUMENTS

| | | | | |
|---|---|---|---|---|
| 3,473,665 A | * | 10/1969 | Duff | 210/207 |
| 3,532,218 A | * | 10/1970 | Dykhouse et al. | 210/207 |
| 3,994,808 A | * | 11/1976 | Kearney | 210/519 |
| 4,376,045 A | * | 3/1983 | Siskind | 210/519 |
| 5,147,556 A | * | 9/1992 | Taylor | 210/519 |
| 5,389,250 A | * | 2/1995 | Wood et al. | 210/519 |
| 5,944,995 A | * | 8/1999 | Sethi et al. | 210/519 |
| 6,869,534 B2 | | 3/2005 | McDowell et al. | |
| 6,966,985 B2 | * | 11/2005 | Schoenbrunn et al. | 210/519 |
| 7,520,995 B2 | * | 4/2009 | Taylor et al. | 210/712 |
| 7,585,665 B2 | | 9/2009 | Iiyama et al. | |
| 7,988,865 B2 | * | 8/2011 | Laros et al. | 210/519 |
| 2008/0110839 A1 | * | 5/2008 | Foreman et al. | 210/801 |

OTHER PUBLICATIONS

International Search Report for PCT/US2010/049442, Nov. 5, 2010.
Written Opinion for PCT/US2010/049442, Nov. 5, 2010.
WesTech Engineering, Inc. (Salt Lake City, Utah) "Contact Clarifier" Brochure, 2007.
WesTech Engineering, Inc. (Salt Lake City, Utah) "HiFlo Thickeners" Brochure, 2008.
WesTech Engineering, Inc. (Salt Lake City, Utah) "Paste and High Density Thickeners" Brochure, 2008.
WesTech Engineering, Inc. (Salt Lake City, Utah) "Clarifier Optimization Package" Brochure, 2006.

* cited by examiner

*Primary Examiner* — Christopher Upton
(74) *Attorney, Agent, or Firm* — Austin Rapp & Hardman (57) ABSTRACT

A feed system is used in a sedimentation vessel. The feed system includes an inlet for receiving a quantity of feed slurry and an outlet for delivering the feed slurry to a separation zone within the sedimentation vessel. The feed slurry includes a mixture of solids and liquids that are to be separated in a separation zone within the sedimentation vessel. An airlift pump is used to cycle at least a portion of either the separated solids or the separated liquids from the separation zone and return it to the feed system. This returned portion mixes with the feed slurry and may operate to dilute the feed slurry to a concentration for optimal separation. Additionally, feed conditioning chemicals may be mixed into the feed slurry prior to or after the mixing of the feed slurry with the returned portion of the separated products.

20 Claims, 7 Drawing Sheets

METHOD OF OPTIMIZING FEED CONCENTRATION IN A SEDIMENTATION VESSEL

TECHNICAL FIELD

The present invention relates generally to sedimentation vessels used for separation of solids and liquids. More specifically, the present invention relates to a new type of feedwell or feed system used in the sedimentation vessel.

BACKGROUND

Many commercial facilities use water or liquid for or as part of their process. Often the liquid contains various solids or particles. It is often necessary or desirable to separate out the solids from the liquid. One type of structure that is used to separate out solids from liquids is a sedimentation vessel.

Sedimentation vessels are routinely used in performing solid/liquid separation in industry. Sometimes, the names "thickener" or "clarifier" are used to generally describe sedimentation vessels. In sedimentation vessels, liquids and solids are separated from each other by gravity as described by Stokes Law. Such sedimentation vessels are commonly used in a variety of different applications.

Generally, the solids and liquids are in a slurry form and are introduced into the separation vessel via a feedwell (which is sometimes referred to as a "feed well"). In some situations, it may be desirable to dilute or concentrate the slurry. However, it would be desirable for an improved system, method and/or apparatus for dilution/concentration of the slurry.

BRIEF SUMMARY OF THE INVENTION

A feed system for use in a sedimentation vessel is disclosed. The feed system comprises an inlet for receiving a quantity of feed slurry and an outlet for delivering the feed slurry to a separation zone within the sedimentation vessel. The feed slurry comprises a mixture of solids and liquids, which are separated from one another in the separation zone. The feed system also comprises an airlift pump that transports at least a portion of either the separated solids or the separated liquids from the separation zone back into the feed system such that the portion mixes with the feed slurry. In some embodiments, the portion returned by the air lift pump is a liquid, whereas in other embodiments, the portion returned is a solid. The portion returned either dilutes or concentrates the feed slurry to a concentration that is optimal for separation. In some embodiments, feed conditioning chemicals are mixed into the feed slurry prior to the mixing of the feed slurry with the portion. The portion is mixed with the feed slurry between the inlet and the outlet of the feed system. The amount of the portion mixed with the feed slurry may be adjusted by adjusting the airlift pump.

The feed system may comprise a feed well. On the interior of the feed well may be one or more baffles. The feed slurry may enter the feed well such that a counter-clockwise or clockwise rotation is created within the feed well. The baffle may be a single baffle with a tapered width. In other embodiments, the feed system also comprises a feed pipe that enters the sedimentation vessel below the weir/liquid level. Further embodiments are constructed in which the feed system comprises a feed pipe that enters from above the sedimentation vessel. The feed system may also include an external tank that includes the inlet. Additional embodiments are designed in which the feed system comprises a drop box feed pipe.

The present embodiments also teach a method of optimizing the concentration of a feed slurry in a sedimentation vessel for solid/liquid separation. The method comprises receiving a quantity of a feed slurry, wherein the feed slurry comprises a mixture of solids and liquids. The method also comprises passing the feed slurry through a feed system comprising an inlet for receiving the feed slurry and an outlet for delivering the feed slurry to a separation zone within the sedimentation vessel. The method comprises separating the feed slurry into solids and liquids within the separation zone and pumping, via an airlift pump, at least a portion of the separated solids or separated liquids from the separation zone into the feed system such that the portion mixes with the feed slurry. In further embodiments, the method comprises adding feed conditioning chemicals into the feed slurry prior to, during, or after the mixing of the feed slurry with the portion.

The present embodiments relate to a positive method of optimizing concentration of the feed material in the feed well, feed pipe, feed launder, and or other feed systems, through the use of an air-lift pump device(s). One of the features of these embodiments is that an airlift pumping device delivers slurry or clarified liquid to the feed systems for the purpose of adjusting the feed stream concentrations and for enhanced feed conditioning and improved sedimentation performance.

The present embodiment may take a portion of clarified overflow liquid (effluent) or settling slurry from within the sedimentation vessel, or from the effluent collection scheme of the vessel and use airlift pump(s) to deliver this portion of liquid into one or more of the feed systems associated with the vessel in order to provide adjustment of the feed slurry concentration.

BRIEF DESCRIPTION OF THE DRAWINGS

In order that the manner in which the above-recited and other features and advantages of the invention are obtained will be readily understood, a more particular description of the invention will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in the Figures, is not intended to limit the scope of the invention, as claimed, but is merely representative of embodiments of the invention.

Figure 1:
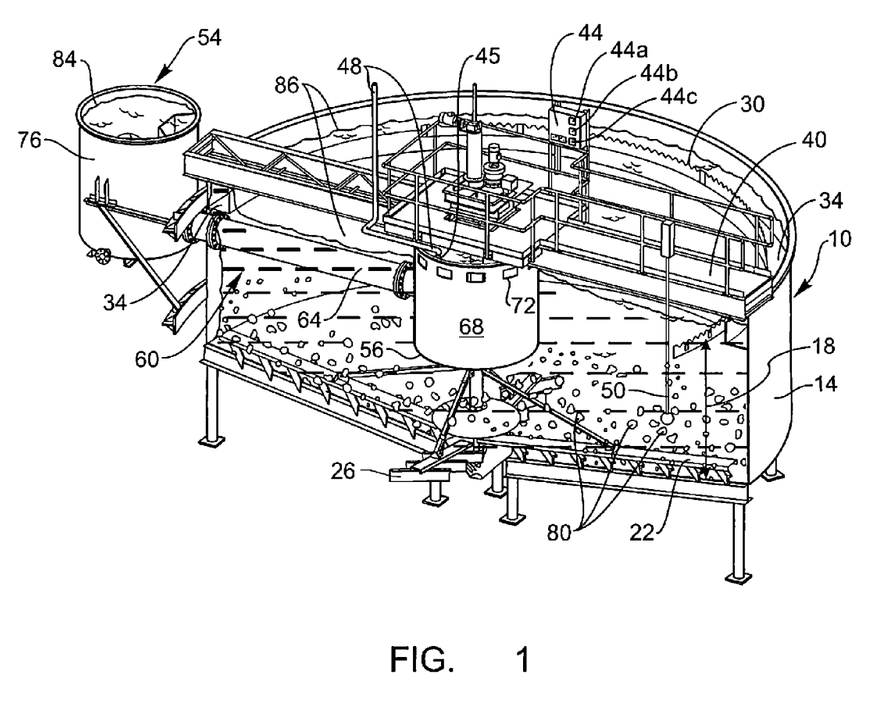
FIG. 1 is a partially cutaway, perspective view of an embodiment of a sedimentation vessel.

Referring now to FIG. 1, a perspective view of a sedimentation vessel 10 is shown. The sedimentation vessel 10 may be referred to as a thickener or a clarifier. It should be noted that the configuration of the sedimentation vessel 10 is provided for illustrative purposes. Those skilled in the art will appreciate that there are a variety of different configurations that may be used for the sedimentation vessel 10.

As its name suggests, the sedimentation vessel 10 is designed to separate solid particles or materials from a liquid. Such a separation process occurs via Stokes law, wherein the solids settle to the bottom of the sedimentation vessel 10 while the clarified liquid is extracted from the top of the vessel 10. The sedimentation vessel 10 includes a separation chamber 14, which in the embodiment of FIG. 1, is shown as a cylindrical unit. Other configurations are also possible. The volume within the chamber 14 comprises the separation zone 18, which is a zone where gravity separation of the solids and liquids occurs. As the solids settle to the bottom of the chamber 14, scrapers 22 may be used to scrape the solids from the bottom of the chamber 14 into a collection unit 26. Although scrapers 22 are shown, rake arms or other features and/or methods (including a steep cone with no rakes) for collecting the solids deposited at the bottom of the chamber 14 may also be used.

The liquid found in the chamber 14 will generally be collected at or near the top of the chamber 14. Specifically, a weir 30 may be used such that the liquid can overflow from the weir 30 (which may be a "vee notch" weir) and be captured into a launder 34. Again, the exact way in which the clarified liquid is collected from the chamber 14 may vary according to specific embodiments. Other configurations and/or collection methods may also be used.

In the embodiment of FIG. 1, a walkway 40 may be positioned above the chamber 14 to allow for repair, maintenance, and/or access to the sedimentation vessel 10. One or more controls 44 may also be added to the sedimentation vessel 10. The controls 44 may be used to control and/or monitor the rise rate or "upflow velocity" of the feed slurry. Rise rate (or upflow velocity) is the rate at which the liquid in the slurry, upon entering the chamber 14, flows upwards and out of the chamber 14 via the weir 30. If the upflow velocity is lower than the settling velocity (the velocity at which the solids in the slurry settle to the bottom of the chamber 14) of the solids, the process may be a continuous process. The controls 44 may also control and/or monitor the amount and/or concentration of the feed slurry and/or other factors. The controls 44 may also be set such that the process within the chamber 14 is not a continuous process. Other embodiments may be designed in which the process within the chamber 14 is indeed a continuous process. A continuous process is one where the amount continually entering the vessel 10 and the amounts exiting the vessel 10 are substantially equal.

The controls 44 may be further designed to control and/or regulate the addition of other chemicals, which are designated as "feed conditioning chemicals" 45. Such chemicals 45 may include flocculation chemicals, coagulation chemicals, conditioning chemicals, etc. These chemicals may be added to the feed stream to enhance the solids/liquid separation process. In addition, dilution of the chemicals used for conditioning, coagulation and flocculation may provide better reaction kinetics, chemical efficiency and solids settling characteristics. Such chemicals may be added through an apparatus 48 (such as one or more supply lines or other similar features). The feed conditioning chemicals 45 may mix in the feed well 68, or may be added upstream of the feed well, downstream of the feed well or at any other location (or multiple locations), as desired. One or more instruments 50 may be used to monitor the conditions within the separation zone 18. For example, the controls 44 may include one or more controls 44a that allow for changing the amount and/or rate of feed conditioning chemicals being added. The controls may also include one or more controls 44b which regulate and/or monitor the rate that the slurry is introduced into the feed system. Such controls may control a pump (not shown) and/or a motor (not shown) which changes the amount and/or rate that the slurry is introduced into the feed system. (The velocity or mass flow that the slurry is introduced may be increased or decreased, as desired.) The controls 44b may also regulate and/or monitor the concentration (up or down) of the slurry by diluting it with more liquid or concentrating it with more solids. The controls 44b may also control the inlet and the outlet of the feed system. Controls may also include one or more controls 44c which controls the operation and setting of the air lift pump (described below). Thus, by adjusting the controls 44, the upflow velocity, the settling velocity, and/or other separation variables may be changed, influenced and/or monitored.

In the embodiment of FIG. 1, the sedimentation vessel 10 includes a feed system 60. The feed system 60 may be designed to introduce the solid and liquid mixture into the separation zone 18. There are a variety of different types of feed systems 60. FIG. 1 shows a feed system 60 that comprises a feed pipe 64 that delivers the solid/liquid mixture (or slurry) into a feed well 68. One or more external tanks 76 (or other collection/storage structures) may also be used as part of the feed system 60.

The feed slurry may be introduced into the feed system 60 via an inlet 54. The inlet 54 may be any structure that is capable of receiving a quantity of the feed slurry and/or introducing the feed slurry into the feed system 60. The inlet 54 may be positioned on a feed pipe 64, feed well 68, or other feed structure (such as an external tank 76). In the embodiment of FIG. 1, the inlet 54 is located at an external tank 76.

The feed system 60 also includes an outlet 56 which allows the quantity of feed slurry to exit the feed system 60 into the sedimentation vessel 10. In the embodiment of FIG. 1, the outlet 56 may be an open bottom of a feed well 68. Other types of outlets may also be used. Further, embodiments may be constructed in which (optional) ports 72 and/or gates (not shown) on the feed well that allow lower density liquid from the exterior of the feed well to flow into the interior. The interior slurry may be generally at a higher specific gravity than the liquid exterior to the feed well, and thus a density gradient may operate to force the lower density liquid through the ports, the airlift pump (as described below) used in this embodiment may be used to increase the density differential to further increase the flow of liquid through the ports. Other methods have been employed using the velocity of the feed stream to induce addition of exterior liquid in a "jet-pump" eductor arrangement. Other methods have included the use of mechanically driven pumping devices such as centrifugal, radial or axial flow pumps.

As noted above, a variety of different feed systems are possible. For example, the feed system may comprise a feed distributor, a feed pipe, and/or a feed launder. Such structures may be used in lieu of or in addition to a feed well. All of these feed systems may be used in sedimentation vessels including thickeners and clarifiers. Any structure capable of introducing the feed slurry into the chamber 14 may be used. These devices accept an incoming feed stream suspension or slurry made up of liquids and solids (particles), and deliver this feed stream into the sedimentation vessel. These structures also dissipate feed stream velocity and momentum. The introduction of the feed into the separation zone as well as the feed well concentration of the sedimentation vessel can be important in the process performance of the sedimentation device. The feed systems can play an important role in chemical conditioning, coagulation and flocculation of particulates and liquid in the feed stream. In certain process applications, the chemical conditioning, coagulation and or flocculation are improved through adjusting the incoming feed stream to an optimal concentration. As stated above, dilution of the chemicals used for conditioning, coagulation and flocculation can provide better reaction kinetics, chemical efficiency and solids settling characteristics.

As explained herein, the feed slurry 84 comprises a mixture of solids and liquids. The purpose of the sedimentation vessel 10 is to separate this slurry into its constituent parts, namely to separate most of the solids from the liquids. Accordingly, the majority of solids 80 will settle to the bottom of the separation zone 18 and the liquid that may still contain solids 86 will rise to the top of the vessel 10. The separation process may be continuous when the rise rate or upflow velocity of the feed slurry 84 in the vessel 10 is lower than the settling velocity of the majority of solids 80 contained in the feed slurry 84.

Figure 2A:
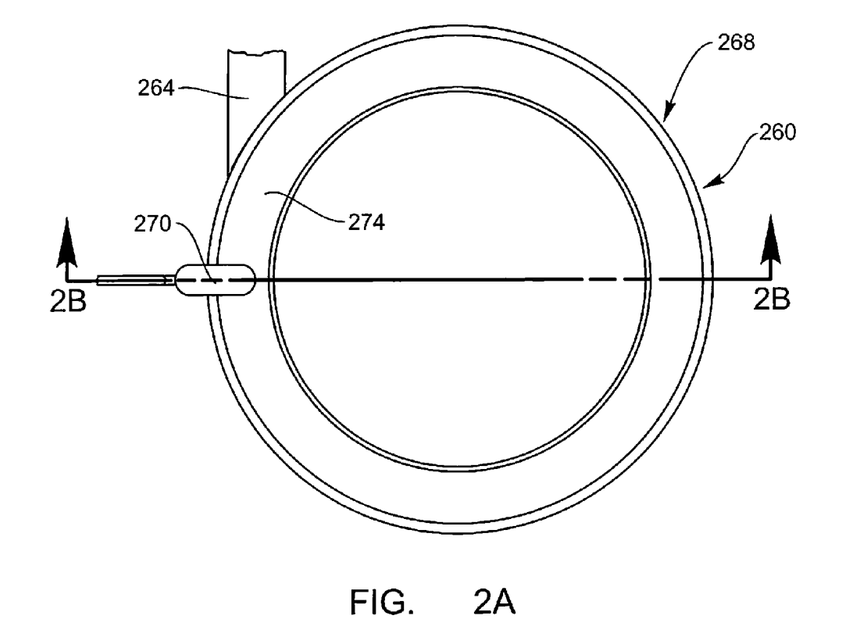
FIG. 2A is a top plan view of an embodiment of a feed well according to the present embodiments that may be used in conjunction with the sedimentation vessel of FIG. 1.
Figure 2B:
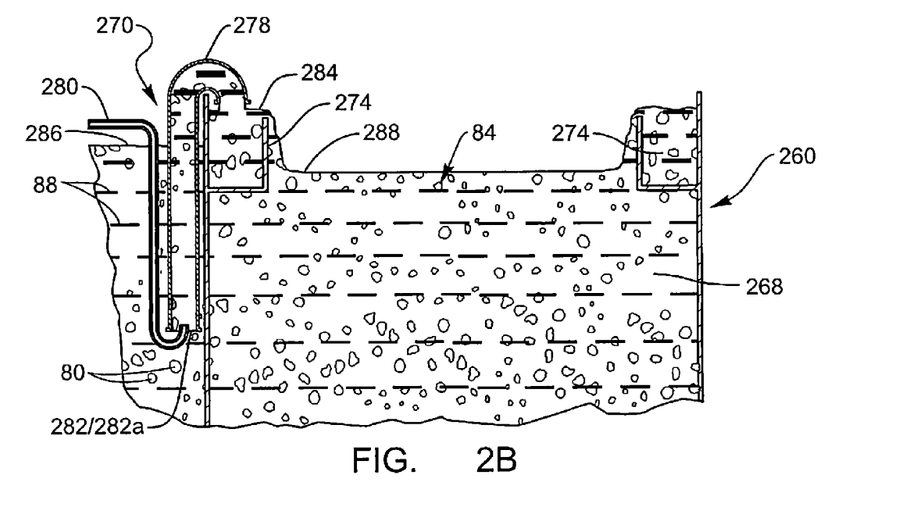
FIG. 2B is a cross-sectional view of the embodiment of FIG. 2A.

FIG. 2A and FIG. 2B represent an embodiment of a feed system 260 according to the present embodiments. FIG. 2A is top plan view of an embodiment of a feed well structure 260 that may be used in conjunction with the feed well system 60 of FIG. 1. FIG. 2B is a cross-sectional view of the embodiment of FIG. 2A (as indicated on FIG. 2A). In fact, the feed system 260 shown in FIG. 2A may replace the feed system 60 in FIG. 1. As can be seen in FIG. 2A, the feed system 260 comprises a feed well 268 that is supplied by a feed pipe 264. The feed system 260 may further include an air lift pump 270. FIG. 2A is shown empty (for clarity) whereas FIG. 2B is shown filled with the slurry that is being separated.

One of the advantages of an air lift pump 270 is that this technology typically does not require moving parts in the process wetted section of the pump. Air-lift pumps are used extensively in water and wastewater treatment applications and achieve their pumping ability by injecting air through a diffuser into an open bottom or open side vessel. Many different air diffusers have been successfully used in airlift pumping, with the subtle differences being air bubble size generated and clogging/non-clogging potential. For the present embodiments, all types of air-lift pump devices are considered and vary only by their pumping capacity and general configuration. The entrained air from the diffuser mixes with the contained liquid in the pump chamber lowering the apparent density of that material. The now higher density source liquid outside of the vessel imparts a pressure due to this density gradient and creates a positive flow, due to the density differential, of the contained material to the adjacent vessel, the discharge may be at a level higher or lower than the surrounding vessels' level. Variable flow of supply air to the diffuser of the device manipulates the apparent internal liquid density allowing for generation of a variable discharge head as required to control flow through the device.

The airlift pump described herein is envisioned to be configured in multiple different ways. Single or multiple pumps with single or multiple suction points and or discharge points may be employed. The depth and location of the airlift pump(s) may be located anywhere within the confines of the tank vessel or connected with the effluent collection scheme exterior to the tank. A positive means of controlling air flow to the airlift pump 270 may be used to provide control of the pumping flow rate.

As explained herein, the present embodiments may take a portion 284 from within the sedimentation vessel 10 (or more particularly from the separation zone 18) and use airlift pump(s) to deliver this portion of liquid into one or more of the feed systems associated with the vessel in order to provide adjustment of the feed slurry concentration. The portion 284, which is shown exiting the pump 270, may be (1) clarified overflow liquid 86 (effluent) or (2) settling slurry 80 (which is a mixture of solids and liquids) or even (3) concentrated slurry in the lower portion of the separation chamber 14 ("concentrated slurry"). Of course, it is also possible to take the portion 284 from the effluent collection scheme of the vessel 10 (such as from the liquid that overflowed the weir 30 (shown in FIG. 1) or the solids scraped by the arms 22 (shown in FIG. 1), or some other portion of the collection scheme of the vessel 10). The airlift pump 270 comprises an inlet that is positioned to collect portion 284 and allow it to be pumped by the pump 270.

The portion 284 may be re-introduced into the feed well 260 between the inlet 54 (shown in FIG. 1) and the outlet 56 (shown in FIG. 1). The introduction of the portion 284 to the feed slurry 84 may have significant advantages. For example, the portion 284 may operate to dilute the slurry 84. More specifically, the concentration of the slurry 84 may be adjusted based upon the introduction of the portion 284. This adjustment of the concentration of the feed slurry 84 may be tailored to provide improved and/or optimal separation. Obviously, the exact concentration of slurry that is desired will depend upon the particular embodiment (e.g., the components being separated, the flow rate, the mass flow, the amount and rate that the slurry is introduced, etc.). Those skilled in the art will be able to adjust the conditions and variables associated with the separation in order to provide optimal results. A control loop with density instrumentation (such as may be found in controls 44 of FIG. 1) may additionally be used to control the dilution/seeding flow rate caused by introduction of the portion 284. Further, the air lift pump 270 and/or other controls 44 may be designed such that the amount of the portion 284 that is mixed with the slurry 84 may be varied or adjusted, as needed. The addition of feed conditioning chemicals 45 may also be used to adjust the separation characteristics, as needed.

In addition to providing dilution liquid to obtain an optimal feed well concentration, the airlift pumping arrangement 270 may be configured to provide additional recirculation of seed solids 80 for increasing concentration to an optimal level by moving previously settled solids 80 from the separation zone 18 in the sedimentation vessel 10 into the feed stream slurry 84. Thus, in some embodiments, the portion 284 re-introduced to the slurry 84 may be clarified (separated) liquid whereas in other embodiments, the portion 284 re-introduced may be some of the settled solids 80.

The volume of liquids or solids pumped back into the feed system will depend primarily on the original feed slurry flow rate and concentration. The feed concentration 84 can vary from a very low feed concentration of 500 ppm to a very high concentration of 45% solids by weight. The concentration of the portion being pumped into the feed system will depend on whether seeding or dilution is required. In the case where seeding is required the concentration of the portion will range between 1%-30% solids by weight. When dilution is required the range of the portion concentration will start at the feed 84 concentration to clear liquor containing no solids. The flow rate of the portion 284 being pumped into the feed system can vary as the feed parameters of slurry flow rate and concentration vary. The flow rate of the portion 284 is varied by changing the air flow rate to the air pump that varies the density in the air pump chamber or by varying the elevation of the exit of the air pump to influence the pressure difference that drives the flow rate.

In the embodiment of FIGS. 2A and 2B, the feed system 260 (and more particularly the feed well 268) may comprise a launder 274. The air lift pump 270 comprises a pump chamber 278 that has an inlet 282a which may be an open suction end 282. Air is pumped through a diffuser 280 into the chamber 278. Because the pump chamber 278 has an open end, slurry (comprising both solids and liquid) also enters the chamber 278. The entrained air from the diffuser mixes with the contained material in the pump chamber 278 lowering the apparent density of that material. The now higher density source liquid outside of the pump chamber 278 imparts a pressure differential due to this density gradient and "pumps" the contained material (dilution/seeding liquid) from the surrounding vessel. (This material is the portion 284 that is being re-introduced into the slurry 84). This pumped material enters the launder 274. Thus, the level 284 (height) of the material in the launder 274 (e.g., after passing through the air lift pump 270) is higher than the original level 286. The material in the launder 274 may then cascade back down into the feed well and then pass into the separation zone 18 for separation. The level of the material in the separation zone 18 is shown by numeral 288. The launder 274, which is also referred to as a dilution feed launder, may be used to provide suitable residence time of the dilution flow in order to release entrained air bubbles in the dilution liquid before being introduced with the feed within the feed well 260. Other structures capable of increasing the residence time (such as another type of other open top vessel) may also be used. The air lift pump delivery is not necessarily at a higher elevation than that the feed well surface 288, the delivery point may be below the water surface 288. The advantage of a lower delivery point is that the resistance to flow is decreased and thus allows a higher dilution/seeding flow rate (pump efficiency).

Figure 3A:
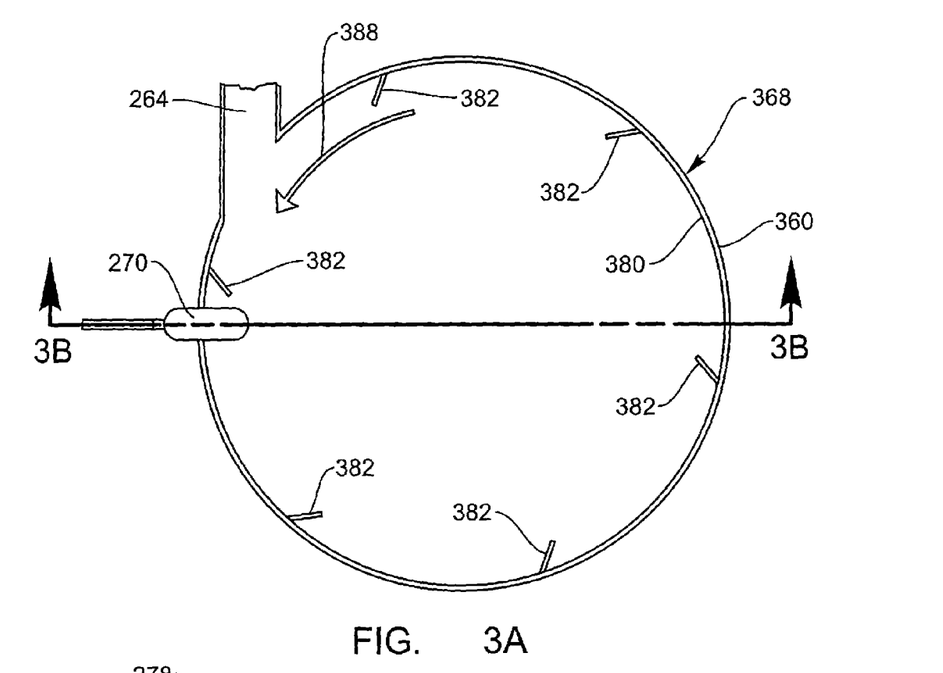
FIG. 3A is a top plan view of an embodiment of a feed well according to the present embodiments that may be used in conjunction with the sedimentation vessel of FIG. 1.
Figure 3B:
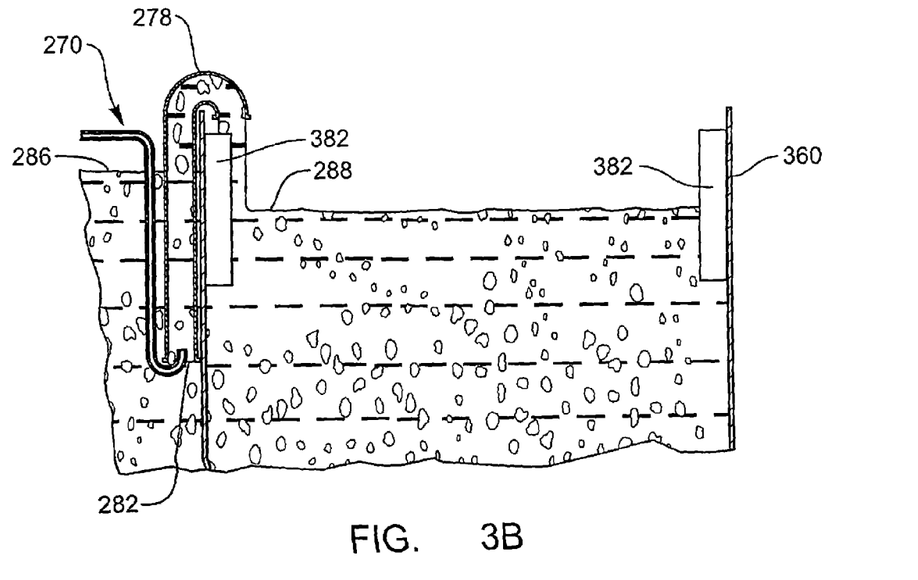
FIG. 3B is a cross-sectional view of the embodiment of FIG. 3A.

FIG. 3A and FIG. 3B represent another embodiment of a feed system 360 for use with a sedimentation vessel 10. FIG. 3A is top plan view of an embodiment of a feed well structure 360 that may be used in conjunction with the feed well system 60 of FIG. 1. FIG. 3B is a cross-sectional view of the embodiment of FIG. 3A (as indicated on FIG. 3A). FIG. 3A is shown empty (for clarity) whereas FIG. 3B is shown filled with the slurry that is being separated. This feed system 360 is a feed well 368 that is supplied by a feed pipe 264. Again, this feed well 368 may be used in place of the feed well 68 shown in FIG. 1. The feed well 368 is also similar to the feed well 268 discussed above. The feed well 368 differs from that which has been described above in that it does not include a launder 274. (The other components of the pump 270 may be similar to that which is described above). Rather, the interior 380 of the feed well 368 includes one or more baffles 382 for mixing the feed slurry within the separation zone 18. The baffles 382 may be either angled or tapered, or even have some other configuration. The baffles 382 shown in FIGS. 3A and 3B are angled baffles. The purpose of the baffles 382 within the feed well 368 is to aid in energy dissipation and mixing of dilution liquid and feed slurry within the feed well 368.

It should also be noted that some embodiments may be constructed in which there is a "right hand" entry of the feed into a feed well 368. This right hand entry causes a counter clockwise rotation when viewed from above (as shown by arrow 388). This counter clockwise rotation specifically provides a resultant upward angular momentum of the feed slurry within the feed well which increases feed slurry detention efficiency and facilitates mixing of the dilution liquid with the incoming feed in a blending zone within the feed well. Additional chemical injection points may also be located within this blending zone of dilution liquid and incoming feed. Further embodiments may be designed in which the entry of the feed into the feed well creates a clockwise rotation (when viewed from above). Still further embodiments may be designed in which the slurry mixes in the chamber without creating a definite rotation in any direction.

The operation of the feed well 360 is similar to that which is discussed above. A portion 284 (not shown in FIGS. 3A and 3B) will be taken from the separation zone (or other portions of the vessel 10) and reintroduced into the feed slurry 84. The portion 284 mixes with the feed slurry 84 thereby adjusting the concentration of the feed slurry. In some embodiments, the feed conditioning chemicals 45 (shown in FIG. 1) may be introduced and mixed with the feed slurry 84 at the same time as the portion 284 is mixed. In other embodiments, the feed conditioning chemicals 45 are mixed with the portion 284 prior to the portion being added to the slurry 84. In further embodiments, the feed conditioning chemicals 45 are mixed with the slurry 84 before the portion 284 is added to the slurry 84.

Figure 4A:
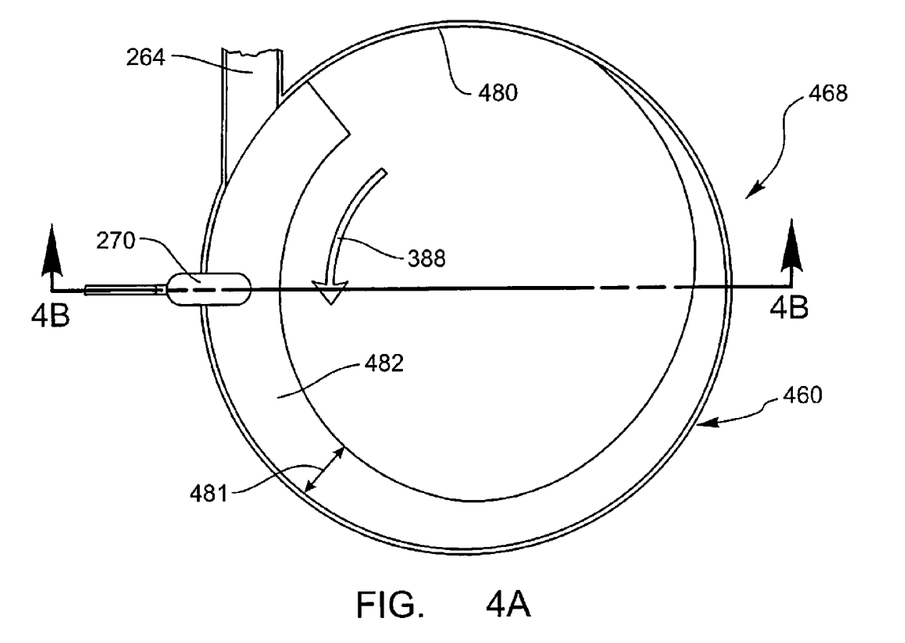
FIG. 4A is a top plan view of an embodiment of a feed well according to the present embodiments that may be used in conjunction with the sedimentation vessel of FIG. 1.
Figure 4B:
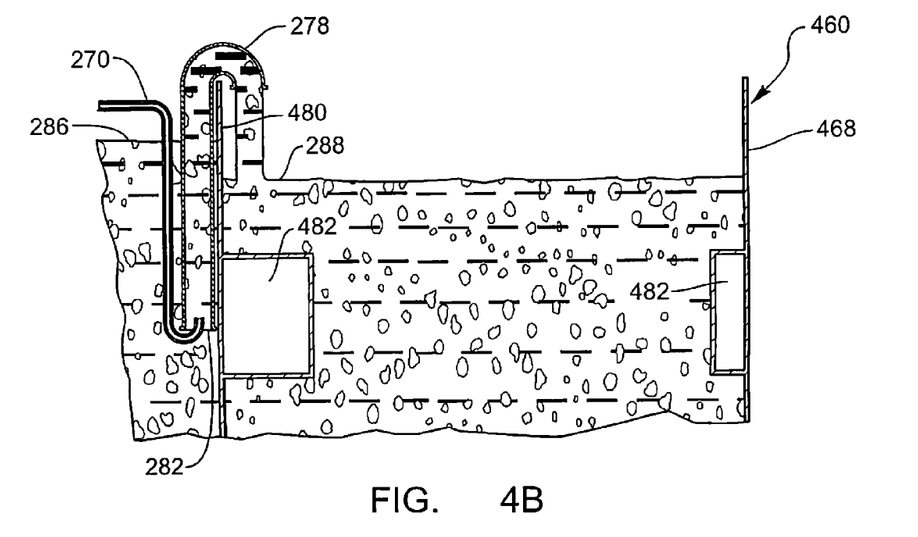
FIG. 4B is a cross-sectional view of the embodiment of FIG. 4A.

FIGS. 4A and 4B represent another type of feed system 460 for use with a sedimentation vessel. FIG. 4A is top plan view of an embodiment of a feed well structure 460 that may be used in conjunction with the feed well system 60 of FIG. 1. FIG. 4B is a cross-sectional view of the embodiment of FIG. 4A (as indicated on FIG. 4A). FIG. 4A is shown empty (for clarity) whereas FIG. 4B is shown filled with the slurry that is being separated. The feed system 460 comprises a feed well 468 that may be used as part of the sedimentation vessel 10 of FIG. 1. The feed well 468 is similar to the embodiment shown above as feed well 368. The feed well 468 may be used in conjunction with an airlift pump 270 that may be similar to that which is described above. However, the feed well 468 of FIGS. 4A and 4B comprises one or more tapered baffles 482 added to the interior 480 of the feed well 468. One purpose of the one or more tapered baffles 482 within the feed well 468 is to aid in energy dissipation and mixing of dilution liquid and feed slurry within the feed well 468.

Only a single tapered baffle 482 is shown in FIGS. 4A and 4B. As can be seen in these figures, the width 481 of the baffle is tapered. This means that the width 481 of the baffle 482 decreases around circumference of the circular feed well 468. The tapered baffle 482 may or may not extend all the way around the entirety of the interior 480 of the feed well 468. As shown in FIG. 4A, the baffle 468 ends prior to completely extending all the way (e.g., 360°) around the interior 480 of the feed well 468. As shown in FIG. 4A, the tapered baffle 482 may help to form a counter clockwise rotation (as viewed from above) in the feed well 486 (as shown by the arrow 388).

This counter clockwise rotation produces an upward angular momentum of the feed slurry within the feed well which increases feed slurry detention efficiency and facilitates mixing of the dilution liquid with the incoming feed in a blending zone within the feed well 460. Other embodiments may be designed to produce a clockwise rotation (as viewed from above).

The operation of the feed well 460 is similar to that which is discussed above. A portion 284 (not shown in FIGS. 4A and 4B) will be taken from the separation zone (or other portions of the vessel 10) and be reintroduced into the feed slurry 84. The portion 284 mixes with the feed slurry 84 thereby adjusting the concentration of the feed slurry.

Figure 5:
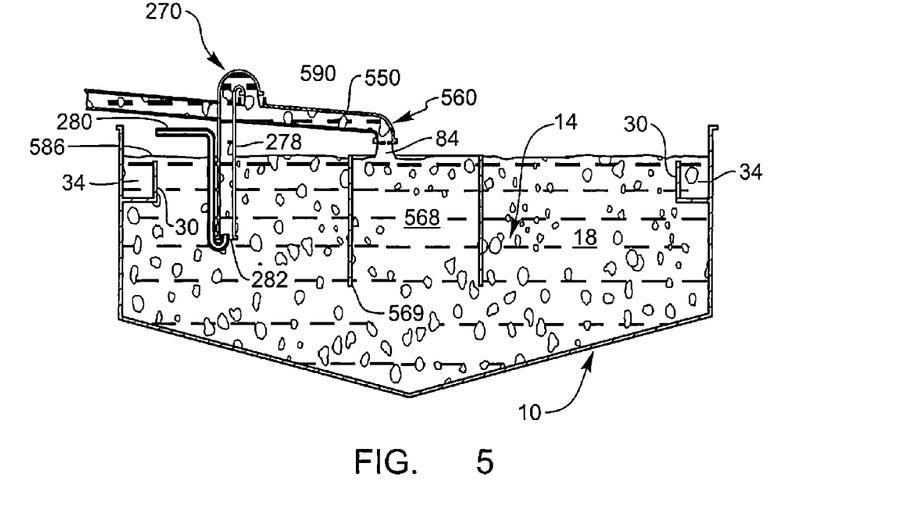
FIG. 5 is a cross-sectional view of another embodiment of a sedimentation vessel including a feed system.

As noted above, the feed system used in the present embodiments may take on a variety of different configurations. FIG. 5 shows a sedimentation vessel 10 with a feed system 560. FIG. 5 is a cross-sectional view similar to that which is shown in FIGS. 2B, 3B, and 4B. However, in FIG. 5, the chamber 14 as well as the feed system 560 is illustrated. FIG. 5 shows the vessel 10 filled with slurry that is being separated. FIG. 5 teaches a feed system that includes an overhead feed pipe 550. This feed pipe 550 is shown in conjunction with a sedimentation vessel 10. The feed pipe 550 is positioned overhead—e.g., positioned above the vessel 10. In other embodiments, the overhead feed pipe 550 may simply be positioned overhead of the liquid level in the sedimentation vessel 10. When the feed slurry exits the pipe 550, it will enter the feed well 568. As described above, the pipe 550 and the feed well 568 are part of the feed system 560. As with the previous embodiments, the feed slurry will pass through the feed pipe 550 into the feed well 568 and then exit the feed well 568 (through any manner of features) into the separation zone 18 where the solid will be separated from the liquid. In the embodiment of FIG. 5, the slurry exits the feed well 568 through an opening in the bottom 569 of the feed well 568. (In some embodiments, the bottom of the feed well 568 may be removed completely, thereby allowing the slurry to enter the zone 18). The liquid (effluent) may be gathered after it passes over the weir 30 (which may or may not be a vee-notch weir). In FIG. 5, the liquid may be gathered in launder 34 after passing over the weir 30. Although not shown in FIG. 5, a mechanism for scraping and/or gathering the solids from the bottom of the chamber 14 may also be used.

As with the prior embodiments, the feed system 560 of FIG. 5 includes an air lift pump 270 that has an open end 282 on the bottom of the pump chamber 278. This open end is submerged below the liquid level 586. Accordingly, air from a diffuser 280 enters the pump chamber 278 and lifts the portion 284 upwards so that it may be mixed with the feed slurry 84 (via conduit 590) in the feed pipe 550 prior to the feed slurry being introduced into the feed well 568.

It should be noted that feed conditioning chemicals may be used with any of the disclosed embodiments, including the embodiment of FIG. 5. The feed conditioning chemicals may be introduced into the feed well 568, the chamber 14, the feed pipe 550, etc. as desired. In other embodiments, the feed conditioning chemicals may be injected into the pumped liquid prior to introduction of the thus prepared liquid into the feed stream via conduit 590. In such embodiments, these conditioning chemicals may be injected into the pumped liquid stream ensuring delivery of pre-diluted chemicals into the feed stream with at least a dilution ratio of between 0.2% and 5% of the forward feed flow rate.

Figure 6:
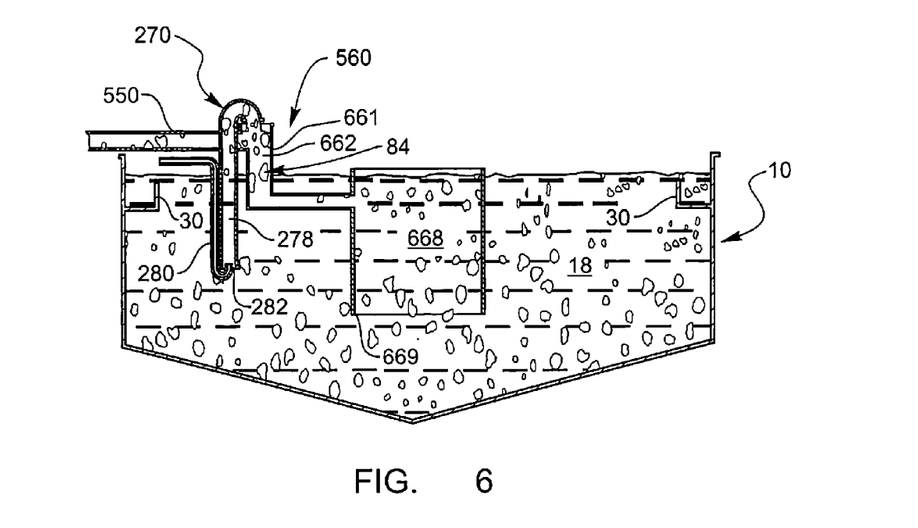
FIG. 6 is a cross-sectional view of another embodiment of a sedimentation vessel including a feed system.

FIG. 6 is another embodiment of a sedimentation vessel 10 that incorporates the present embodiments. FIG. 6 is an embodiment of a feed system 660 that is similar to that which was described in FIG. 5. Accordingly, for purposes of brevity, much of this prior discussion will not be repeated. FIG. 6 is a cross-sectional view similar to that which is shown in FIGS. 2B, 3B, and 4B. However, in FIG. 6, the chamber 14 as well as the feed system 660 is illustrated. FIG. 6 shows the vessel 10 filled with slurry that is being separated. The feed system 660 that includes an overhead feed pipe 550, a feed well 568 and an air lift pump 270. The feed system 660 differs from that which is shown above in that it includes a drop box feed pipe 662. Specifically, after passing through the feed pipe 550 (and mixing with the materials introduced via the air lift pump 270), the feed slurry will pass through the drop box feed pipe 662 prior to being introduced into the feed well 668. This drop box feed pipe 662 may be advantageous in certain applications. After entering the feed well 668, the slurry will exit the feed well 668 via an opening in the bottom 669 of the feed well 668 and enter the separation zone 18 where it will be separated into solids and liquids.

The operation of the feed well 660 is similar to that which is discussed above. A portion 284 will be taken from the separation zone (or other portions of the vessel 10) and be reintroduced into the feed slurry 84 at or proximate the drop box 661. The portion 284 mixes with the feed slurry 84 thereby adjusting the concentration of the feed slurry.

Figure 7:
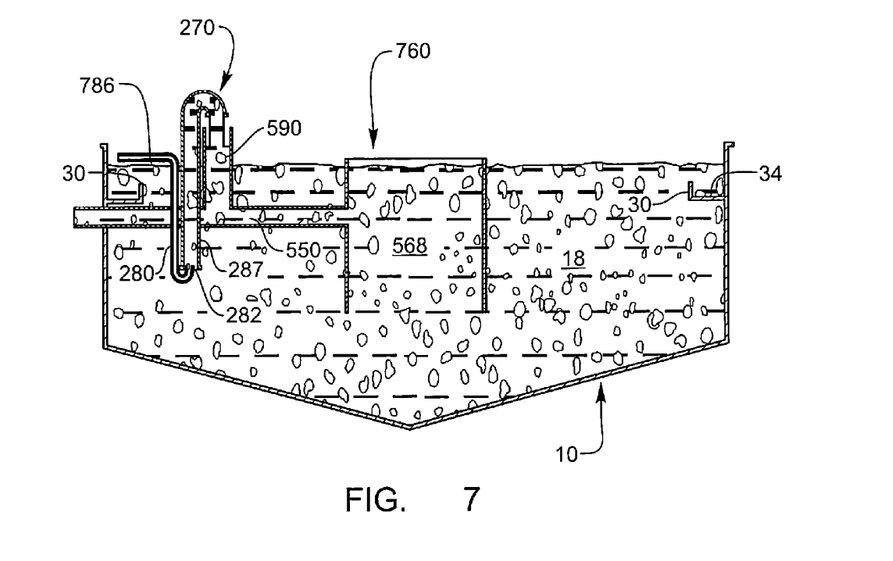
FIG. 7 is a cross-sectional view of another embodiment of a sedimentation vessel including a feed system.

FIG. 7 is another embodiment of a sedimentation vessel 10 that incorporates the present embodiments. FIG. 7 is an embodiment of a feed system 760 that is similar to that which was described in FIG. 5. Accordingly, for purposes of brevity, much of this prior discussion will not be repeated. FIG. 7 is a cross-sectional view similar to that which is shown in FIGS. 2B, 3B, and 4B. However, in FIG. 7, the chamber 14 as well as the feed system 760 is illustrated. FIG. 7 shows the vessel 10 filled with slurry that is being separated. The feed system 760 that includes feed pipe 550, a feed well 568 and an air lift pump 270. However, unlike the prior embodiments, the feed pipe 550 is submerged below the liquid level 786 in the separation zone 18. In other words, the feed system 760 includes a feed pipe 550 that is below the weir 30 through which the separation liquid exits out of the separation zone. The air lift pump 270 (as described above) will pump the portion 284 (not shown in FIG. 7) so that it may be mixed with the feed slurry (via conduit 590) in the feed pipe 550 prior to the feed slurry being introduced into the feed well 568.

Figure 8:
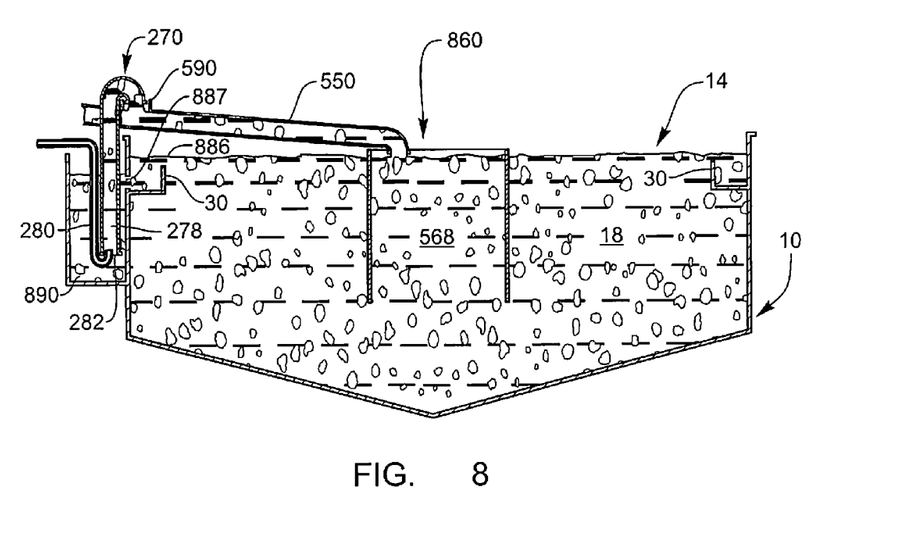
FIG. 8 is a cross-sectional view of another embodiment of a sedimentation vessel including a feed system.

FIG. 8 is another embodiment of a sedimentation vessel 10 that incorporates the present embodiments. FIG. 8 is an embodiment of a feed system 860 that is similar to that which was described in FIG. 5. Accordingly, for purposes of brevity, much of this prior discussion will not be repeated. FIG. 8 is a cross-sectional view similar to that which is shown in FIGS. 2B, 3B, and 4B. However, in FIG. 8, the chamber 14 as well as the feed system 860 is illustrated. FIG. 8 shows the vessel 10 filled with slurry that is being separated. The feed system 860 that includes an overhead feed pipe 550, a feed well 568 and an air lift pump 270. The feed pipe 550 is positioned overhead of the sedimentation vessel 10. However, unlike the prior embodiments, the air lift pump 270 is positioned exterior of the chamber 14. Specifically, after the clarified liquid 86 has passed over the weir 30, it may exit the chamber 14. The liquid level in the chamber 14 is shown by level 886. Once passing over the weir 30, the liquid 86 is positioned in a retention vessel 890. The vessel 890 is exterior of the chamber 14 and/or the separation zone 18. The level of the liquid in the vessel 890 is represented by level 887. The air lift pump 270 may also be positioned within or proximate the vessel 890. The air lift pump 270, will create a pressure differential that will pump a portion of the liquid 86 out of the vessel 890, into the air lift pump(s) 270 so that it may be mixed with the feed slurry (via conduit 590) in the feed pipe 550 prior to the feed slurry being introduced into the feed well 568. The remaining liquid in the retention vessel 890 may then be extracted and used, as desired.

The embodiment shown in FIG. 8 operates in which the clarified liquid 86 is the portion 284 that is mixed with the slurry 84 to accomplish dilution of the slurry 84. Similar embodiments may be designed in which the air lift pump 270 pumps the separated concentrated slurry in the lower portion of the separation chamber 14 and uses that as the portion 284 which is mixed with the slurry. This concept may be referred to as seeding the slurry with separated solids. Such recirculation of seed solids 80 may increase the concentration of solids in the slurry to an optimal level.

Figure 9:
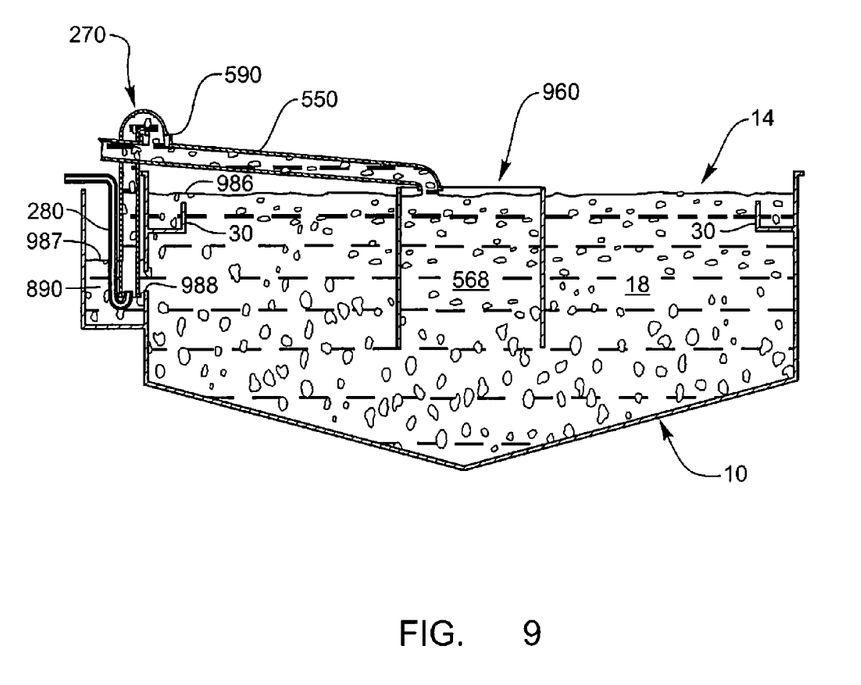
FIG. 9 is a cross-sectional view of another embodiment of a sedimentation vessel including a feed system.

FIG. 9 is another embodiment of a sedimentation vessel 10 that incorporates the present embodiments. FIG. 9 is a cross-sectional view similar to that which is shown in FIGS. 2B, 3B, and 4B. However, in FIG. 9, the chamber 14 as well as the feed system 960 is illustrated. FIG. 9 shows the vessel 10 filled with slurry that is being separated. The feed system 960 that includes an overhead feed pipe 550, a feed well 568 and an air lift pump 270. The level of the liquid (feed slurry) in the chamber 14 is represented by numeral 986. As with the embodiment shown in FIG. 8, the air lift pump 270 is housed within a vessel 890 that is exterior of the chamber 14. In the embodiment of FIG. 9, the feed slurry, including both solids and liquids may enter the vessel 890 via passage 988. The level of the feed slurry 84 (or perhaps clarified liquid) in the vessel 890 is represented by numeral 987 and may be equal to the level 986. The air lift pump 270, will pump the liquid and/or slurry out of the vessel 890, into the air lift pump so that it may be mixed with the feed slurry (via conduit 590) in the feed pipe 550 prior to the feed slurry being introduced into the feed well 568. In other embodiments, the embodiment shown in FIG. 9 could be used with a submerged feed pipe, or other feed system. Referring now to all of the Figures generally, the present embodiments also teach a method of optimizing the concentration of a feed slurry 84 in a sedimentation vessel 10. The method involves obtaining a feed system, such as the feed systems that are described herein. An amount of feed slurry 84 is also obtained, the feed slurry comprising a mixture of solids 80 and liquid 86. The feed slurry is introduced into a separation zone 18 which is within a sedimentation vessel 10. In this zone 18, the solids 80 are separated from the liquid 86. More specifically, the solids settle to the bottom of the zone 18 and the liquid 86 rises to the top. An airlift pump 270 is also added. The airlift pump 270 is used to pump at least a portion 284 of the settling slurry, the separated solid or the separated liquid from the separation zone 18 into the feed system such that the portion 284 mixes with the feed slurry 84. In some embodiments, the feed system comprises a feed well, wherein the method comprising adding the feed slurry to the feed well such that a counter clockwise rotation is created within the feed well. In other embodiments, the interior of the feed well includes on or more baffles, wherein the method further comprises contacting the feed slurry with the baffles. The method may further comprise the step of adding feed conditioning chemicals 45 into the feed slurry 84 prior to the mixing of the feed slurry 84 with the portion 284.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A feed system for use in a sedimentation vessel, the feed system comprising:
   an inlet for receiving a quantity of feed slurry, wherein the feed slurry comprises a mixture of solid and liquid;
   an outlet for delivering the feed slurry to a separation zone within the sedimentation vessel, wherein some of the solids are settled from the feed slurry producing a quantity of settled solids and separated liquid; and
   an airlift pump that transports at least a portion of the separated solid and/or the separated liquid from the separation zone into the feed system such that the portion mixes with the feed slurry.

2. A feed system as in claim 1 wherein the air lift pump comprises an inlet that is positioned to collect the portion from the separated liquid.

3. A feed system as in claim 1 further comprising an apparatus that mixes feed conditioning chemicals into the feed slurry.

4. A feed system as in claim 1, wherein the feed system comprises a feed well.

5. A feed system as in claim 4 wherein the feed well comprises a launder.

6. A feed system as in claim 4, wherein the interior of the feed well comprises one or more baffles.

7. A feed system as in claim 6, wherein the feed slurry enters the feed well such that a counter clockwise rotation is created within the feed well.

8. A feed system as in claim 7 wherein there is only a single baffle with a tapered width.

9. A feed system as in claim 6, wherein the feed slurry enters the feed well such that a clockwise rotation is created within the feed well.

10. A feed system as in claim 1 wherein the feed system comprises a feed pipe that is below a weir through which the separated liquid exits out of the separation zone.

11. A feed system as in claim 1 wherein the feed system comprises a feed pipe that is positioned above the sedimentation vessel.

12. A feed system as in claim 1 wherein the feed system comprises an external tank that includes the inlet.

13. A feed system as in claim 1 wherein the feed system comprises a drop box feed pipe.

14. A feed system as in claim 1 wherein the portion is mixed with the feed slurry between the inlet and the outlet.

15. A feed system as in claim 1 wherein the amount of the portion mixed with the feed slurry may be adjusted.

16. A method of optimizing the concentration of a feed slurry in a sedimentation vessel comprising:
   receiving a quantity of a feed slurry, wherein the feed slurry comprises a mixture of solid and liquid;
   passing the feed slurry through a feed system comprising:
      an inlet for receiving the quantity of feed slurry;
      an outlet for delivering the feed slurry to a separation zone within the sedimentation vessel,
   allowing some of the solids to settle from the feed slurry within the separation zone producing a quantity of settled solids and a quantity of separated liquid; and
   pumping, via an airlift pump, at least a portion of settling solid and/or the separated liquid from the separation zone into the feed system such that the portion mixes with the feed slurry.

17. A method as in claim 16 wherein the portion dilutes the feed slurry to a concentration that is optimal for separation.

18. A method as in claim 16 wherein the feed system comprises a feed well, wherein the method comprising adding the feed slurry to the feed well such that a counter clockwise rotation is created within the feed well.

19. A method as in claim 16 wherein the feed systems comprises a feed well, wherein the interior of the feed well includes one or more baffles, wherein the method further comprises contacting the feed slurry with the baffles.

20. A method as in claim 16 further comprising the step of adding feed conditioning chemicals.

* * * * *